United States Patent Office

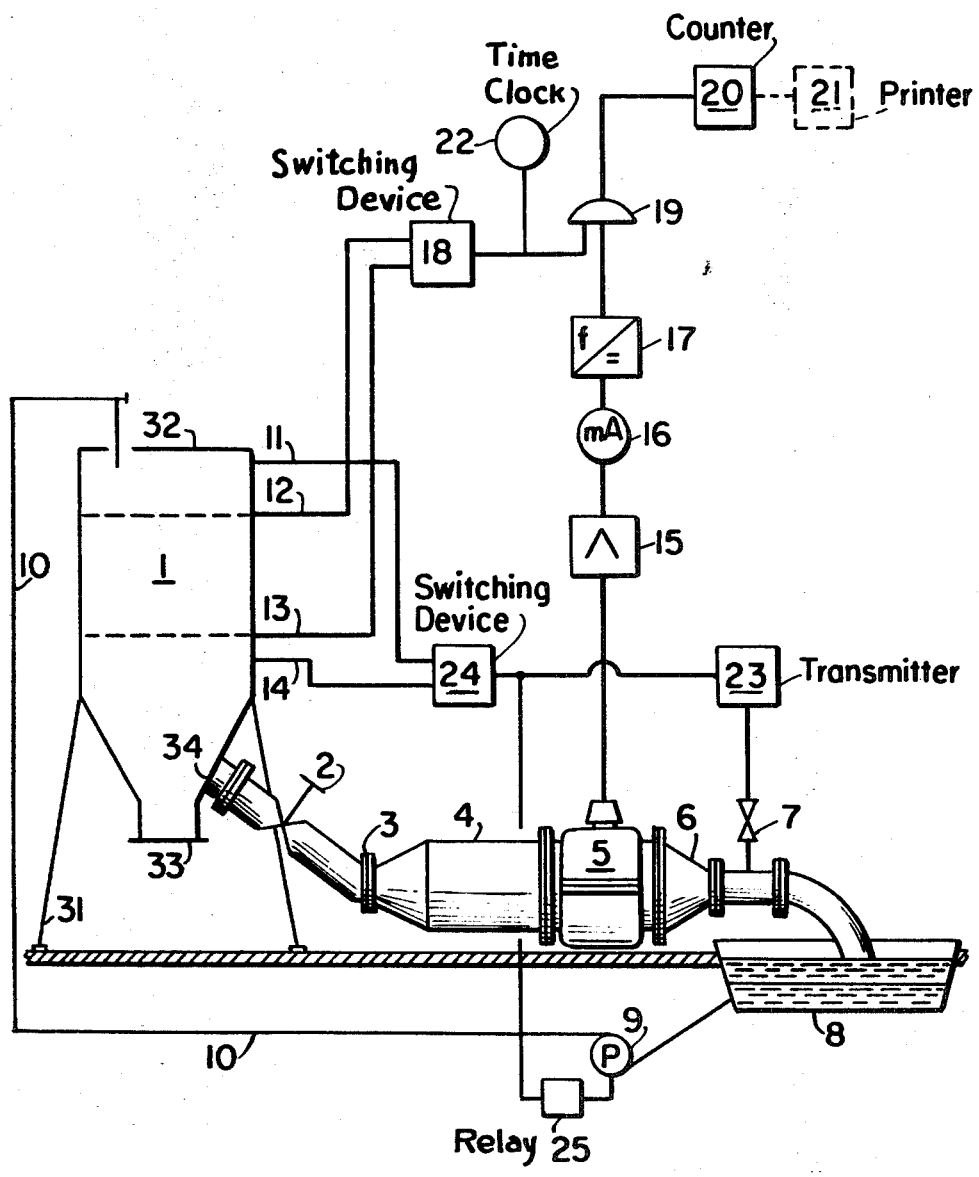

3,605,481
Patented Sept. 20, 1971

3,605,481
MEASURING THE ACCURACY OF FLOW VOLUME METERS
Walter Basler, Basel, Switzerland, assignor to Firma Rheometron G.m.b.H., Basel, Switzerland
Filed Oct. 21, 1969, Ser. No. 868,084
Claims priority, application Germany, Oct. 28, 1968,
P 18 05 605.8
Int. Cl. G01f 25/00
U.S. Cl. 73—3                9 Claims

ABSTRACT OF THE DISCLOSURE

The accuracy for the purpose of calibration of flow volume meters, having flow rate indicators, is measured by providing a column of measuring liquid and delivering a certain or limited volume of the liquid, by gravity flow, from the column to the meter to be tested. The flow flows through the meter at a flow rate which decreases with the decrease in height of the column. During the flow of liquid the flow rate is measured by suitable means, and this actual flow rate is compared with the flow rate indicated by the rate indicator of the meter. An elevated gravity flow container is provided for the column of liquid and its outlet is connected, through a shut-off valve to the meter, with the meter discharge emptying into a suitable receptacle from which, after the test is completed, the measuring liquid is returned to the container by a relatively low capacity pump. The indicated flow rate of the meter preferably is integrated, and additional liquid level detectors initiate and terminate the flow of liquid through the meter. Vertically spaced level detectors in the container initiate and terminate the time measurement.

BACKGROUND OF THE INVENTION

Using known procedures, considerable expense is required for testing the accuracy of large diameter flow volume meters equipped with electrical transmitters for providing a flow rate indication. The reason for the relatively considerable expense in such accuracy testing is the large quantity of measuring liquid which has to be passed through the flow meters. In particular, known testing procedures require a high capacity pump unit, or pump aggregate, associated with a recirculating flow system, valves, and the like, in order to be able to carry out the measurement under steady, state conditions. Furthermore, such liquid recirculation systems are, in themselves, not only expensive, but also require a substantial amount of space.

SUMMARY OF THE INVENTION

This invention relates to measuring the accuracy of flow volume meters having flow rate indicators and, more particularly, to a novel, improved, simplified and economical method and apparatus for performing such measurements and without requiring the use of high capacity pumps or recirculating systems.

In accordance with the invention, exact measurement of the accuracy of flow volume meters, having flow rate indicators, can be effected at a relatively small expense. For example, only a small capacity pump unit or pump aggregate is required, even though exact measurement of the accuracy can be effected. Additionally, steady state conditions during the testing are no longer necessary, and the tests may be made with a non-constant flow of the measuring liquid.

In accordance with the invention, the hitherto required circulating system for large volumes of liquid, and customarily requiring large diameter closed circuit flow systems, including large valves and high pump outputs, resulting in an expensive and space-requiring recirculation plant, is replaced by a high level or gravity container or tank into which there is placed a limited volume of liquid. The liquid flows by gravity from the container or tank through the meter to be tested, with the flow rate decreasing with decreasing level of the measuring liquid in the tank. The flow rate indication of the flow meter is compared with the indication of a measuring arrangement, which measures, during gravity flow of the liquid from the elevated tank through the meter, the volume of liquid flowing through the meter, such measurement being effected by p.e. by measuring pulses or by means of a continuous measuring arrangement.

In a particularly preferred embodiment of the invention, the gravity liquid flow from the elevated or gravity container, whose flow rate decreases with the decrease in the height of the liquid in the container, is conducted through the flow meter to be tested until an exactly determined volume of liquid has flown through the flow meter. During this time, the measuring results of the flow meters are integrated in digital form and are stored, and the integration result is compared with the predetermined volume of liquid in such a manner that the flow of the predetermined quantity of liquid is initiated and terminated by pulses. This means that pulses are supplied each time when a predetermined partial volume of the liquid has run out of the elevated container, and particularly always the same predetermined partial volume of the liquid.

The predetermined volume of liquid is indicated, in a particularly simple manner, by liquid level detectors arranged at various levels in the elevated or gravity container. The liquid level indicators may be used also for switching of the flow blocking and control members which control the liquid flow, and may be additionally utilized for switching the small capacity pump which returns the liquid to the elevated or gravity container after the test has been completed.

Testing the measuring accuracy of flow volume meters, in accordance with the invention, may be effected with relatively small volumes of liquid provided that the characteristic curves of the flow rate transmitter, associated with the flow meter under test, and of the amplifier connected to the transmitter, are linear. Such linear characteristics generally can be obtained without difficulty.

The characterizing feature of the invention accuracy measurement is that the flow velocity through the flow meter, and thus the indications of the rate transmitter, vary or fluctuate. Thus, one does not operate at one point of the flow rate transmitter characteristic curve but, during the measurement, within a predetermined range of such characteristic curve.

The volume of liquid which has flown through the meter under test during the measurement of its accuracy can be caught and returned to the elevated or gravity container by means of a pmp having a relatively small capacity. For the purpose of returning the measuring liquid to the container, there is available the entire time elapsing during removal of the tested flow meter and the connection of the next flow meter to be tested.

The essence of the present invention is the replacement of the continuous circulation of the measuring liquid by supplying a certain volume of measuring liquid into an elevated or gravity container, and testing a flow meter during gravity outflow of this volume by means of a comparison measurement, and particularly by means of the method mentioned for the preferred embodiment. Thus, no continuous circulation is necessary.

An object of the invention is to provide an improved method and apparatus for testing the measuring accuracy of flow volume meters having flow rate indicators.

Another object of the invention is to provide such a method and apparatus requiring only a small expense for testing a flow meter.

A further object of the invention is to provide such a method and apparatus which does not require a measuring liquid circulating system.

Another object of the invention is to provide such a method and apparatus which requires only a small amount of space.

A further object of the invention is to provide such a method and apparatus in which only a low capacity pump is needed for returning the measuring liquid to a container.

For an understanding of the principles of the invention, reference is made to the following description of a typical embodiment thereof as illustrated in the drawing.

BRIEF DESCRIPTION OF THE DRAWING

In the drawing, the single figure is a somewhat schematic elevation view and electrical diagram of a measuring arrangement embodying the invention.

DESCRIPTION OF THE PREFERRED EMBODIMENT

Referring to the drawing, a high or gravity container 1 is elevated on supports 31 and is closed at the top by means of a cover 32 and at the bottom by means of a blank flange 33 which can be removed for the purpose of emptying and cleaning container 1. Container 1 has a lateral outlet 34 extending from its substantially hopper-shaped bottom, and flow of liquid from container 1 through outlet 34 is controlled by a regulating and blocking valve 2. A diffuser 3 serves as a transition section connecting valve 2 to an inlet pipe 4 having the cross sectional area and diameter of the meter 5 to be tested, pipe 4 and diffuser serving as the liquid inlet to the meter 5.

At the other end of the test meter 5, a reducing member 6 forms a transition section connecting meter 5 to a high speed or quick closing slide 7 for blocking flow of liquid from meter 5 and through the meter. When slide 7 is open, the liquid flowing out of test meter 5, is caught in a basin 8, from which it may be returned into high or gravity container 1 by means of a pump 9 and return flow pipe 10. Since much more time is available for pumping the liquid back into the container 1 than is available for the testing of meter 5, the output of pump 5, its capacity, can be correspondingly small as can also be the diameter of the return line 10.

In the interior of container 1, there are arranged four probes or liquid level detectors 11–14. Also, meter 5 is equipped with a flow rate transmitter electrically connected to the input of an amplifier 15, which must meet special requirements as to linearity and accuracy of reproduction. The output of amplifier 15 is supplied to the flow control through a milliammeter 16, although meter 16 could be replaced by a high speed recorder. A direct current-frequency milliammeter 16 into a current having a frequency proportional to the current value. The output pulses of converter 17 are supplied, through a gate 19, to an electronic counter 20 which may be connected with a printer 21.

High speed flow blocking slide 7 is actuated by the pulse from a switching device 24. This device 24 is connected with the level probes 11 and 14 which are situated relatively closely above the probe 12 and below the probe 13, respectively. The two center level probes of detectors are connected to a switching device 18 which not only controls gate 19 but also serves to switch a time clock 22 on and off.

Pump 9 is controlled, through a relay 25, by switching device 24. High speed flow blocking device 7, pump 9 and counter 20, alternatively, may be manually controlled or operated.

The described arranagement operates in a manner which will now be described. With a test meter 5 connected to high or gravity container 1, with valve 2 open, high speed flow blocking slide 7 is opened, responsive to a signal from level detector 11 as applied to switching device 24 controlling transmitter 23, when the liquid level in tank 1 reaches the level of the detector 11. The liquid thus starts to flow through meter 5, by gravity flow from container 1, with discharge of the liquid into receptacle 8. As the liquid level drops to the level of detector 12, through switching device 18 the timing device 22 is actuated and the gate 19 is opened so that the amplified flow rate signals of meter 5 may be transmitted to counter 20. As the liquid level in container 1 drops to the level of level detector 13, timing device 22 is stopped and gate 19 is closed so that there is obtained the indication of the time needed for the liquid level to drop from the level of detector 12 to the level of detector 13 as well as an indication of the integrated value of the flow rate signals from meter 5, as recorded in counter 20 or on printer 21. The liquid level in container 1, however, continues to drop until it reaches the level of level detector 14, which then, through switching device 24, operates transmitter 23 to quickly shut valve 7. At the same time, pump 9 may be started through relay 25, from switching device 24, so that a slow pumping of the liquid in receptacle 8 back into container 1 through line 10 is initiated.

With a known volume of liquid, represented between the levels 12 and 13 of container 1, having flown by gravity through meter 5 in the time indicated by timing device 22, the actual flow rate can be readily calculated and compared with the indicated flow rate as given by the counter 20 and/or the printer 21. Thereby, the measurement accuracy of the flow volume meter 5, under test, is readily determined.

While a specific embodiment of the invention has been shown and described in detail to illustrate the application of the principles of the invention, it will be understood that the invention may be embodied otherwise without departing from such principles.

What is claimed is:

1. A method of testing the measuring accuracy of flow volume meters, having flow rate indicators, comprising the steps of providing a column of measuring liquid; delivering a limited volume of measuring liquid only from the column to a meter to be tested only through flow to the meter at a flow rate which decreases with the decrease in height of the column of measuring liquid; collecting the liquid discharged from the flow meter; during such flow of liquid through the meter, measuring the actual flow rate of the liquid and measuring and integrating the flow rate indications of the flow rate indicator of the meter; comparing the actual flow rate with the integrated indicated flow rate of the meter; and, only after completing the testing of a meter, returning the collected liquid to the column at a flow rate less than that pertaining during the testing and less than that necessary for calibration of the meter using forced circulation of the liquid.

2. A method of testing the measuring accuracy of flow volume meters, as claimed in claim 1, including the steps of initiating delivery of the predetermined volume of measuring liquid to a meter to be tested when the height of the column of measuring liquid has a first and relatively high value; and terminating the delivery of such predetermined volume of measuring liquid to a meter to be tested when the height of the column of measuring liquid has decreased to a predetermined lower value.

3. A method of testing the measuring accuracy of flow volume meters, as claimed in claim 1, including the steps of initiating flow of measuring fluid through the meter when the column of liquid has a first preselected height; initiating the time measurement when the column of liquid has decreased to a second height; terminating the time measurement when the column of liquid has decreased to a third height; and interrupting the flow of measuring liquid through the meter when the column of liquid has further decreased to a fourth height; the predetermined volume of measuring liquid representing the volume of liquid in the column between said second height and said third height.

4. A method of testing the measuring accuracy of flow volume meters, as claimed in claim 1, including the steps of, during flow of said predetermined volume of measuring liquid through the meter to be tested, integrating the flow rate indications of the flow rate indicator associated with the meter to be tested, in digital form; and storing the digitally integrated flow rate indications for the comparison step.

5. A method of testing the measuring accuracy of flow volume meters, as claimed in claim 4, including the step of initiating and terminating the time measurement responsive to control pulses indicative of two different heights of said column of measuring liquid, the volume of said column of measuring liquid between said two different heights constituting said predetermined volume.

6. Apparatus for testing the measuring accuracy of flow volume meters, having flow rate indicators, comprising, in combination, an elevated container arranged to support a column of measuring liquid, and having a flow outlet adjacent its lower end; conduit means connecting said flow outlet to the inlet of a meter to be tested for flow of the liquid to the meter inlet; control means selectively operable to initiate and terminate delivery of a predetermined volume of measuring liquid through said outlet to a meter to be tested connected thereto to flow solely through the meter at a flow rate which decreases with the decrease in height of the column of measuring liquid in said container; timing means operable to measure the time required for such predetermined volume of measuring liquid to flow solely through the meter to determine the actual flow rate; means operable, responsive to initiation and termination of the delivery of such predetermined volume of measuring liquid to the meter, respectively, to initiate operation of said timing means and to terminate operation of said timing means, respectively; second control means operable, responsive to initiation of the delivery of such predetermined volume of measuring liquid to the meter to initiate integration of the flow rate indications of the flow rate indicator of the meter and, responsive to termination of the delivery of such predetermined volume of measuring liquid to the meter, to terminate such integration; a receptacle receiving liquid discharged from the meter to be tested during testing thereof; a liquid return line connected to said container; and a pump having an inlet connected to said receptacle and an outlet connected to said liquid return line and having an output flow rate substantially less than the rate of flow of liquid from said elevated container to said meter inlet, said pump, following a test, returning the liquid to said elevated container during a time period substantially longer than the time required to flow the same quantity of liquid by gravity through the meter during testing of the meter.

7. Apparatus for testing the measuring accuracy of flow volume meters, having flow rate indicators, comprising, in combination, an elevated container arranged to support a column of measuring liquid, and having a gravity flow outlet; means connecting said gravity flow outlet to the inlet of a meter to be tested; control means selectively operable to initiate and terminate delivery of a predetermind volume of measuring liquid through said gravity outlet to a meter to be tested connected thereto to flow through the meter at a flow rate which decreases in height of the column of measuring liquid in said container; timing means operable to measure the time required for such predetermined volume of measuring liquid to flow through the meter to determine the actual flow rate; means operable, responsive to initiation and termination of the delivery of such predetermined volume of measuring liquid to the meter, respectively, to initiate operation of said timing means and to terminate operation of said timing means, respective; and second control means operable, responsive to initiation of the delivery of such predetermined volume of measuring liquid to the meter to initiate integration of the flow rate indications of the flow rate indicator of the meter and, responsive to termination of the delivery of such predetermined volume of measuring liquid to the meter, to terminate such integration; said first-mentioned control means comprising a quick-acting valve controlling discharge of liquid from the meter to be tested, signal responsive means effecting actuation of said quick-acting valve, and first and second vertically spaced level detectors in said container in operative connection with said signal responsive means and operable, responsive to the measuring liquid level in said container being at the height of said first level detector to effect operation of said signal responsive means to open said quick-acting valve and, responsive to the liquid level in said container attaining the level of said second level detector to effect operation of said signal responsive means to close said quick-acting valve.

8. Apparatus for testing the measuring accuracy of flow volume meters, as claimed in claim 7, including a third level detector in said container, somewhat below said first level detector; a fourth level detector in said container, below said third level detector and somewhat above said second level detector; a switching device connected to said third and fourth level detectors and to said timing means; said switching device initiating operation of said timing means responsive to the liquid in said container reaching the level of said third level detector and terminating operation of said timing means responsive to the liquid in said container reaching the level of said fourth level detector.

9. Apparatus for testing the measuring accuracy of flow volume meters, as claimed in claim 8, in which said second control means includes a gate having a first input connected to the flow rate indicator of the meter to be tested, a second input connected to said switching device, and an output; and a counter connected to said gate output; said second switching device opening and closing said gate responsive, respectively, to initiation of operation of said timing means and to termination of operation of said timing means.

References Cited
UNITED STATES PATENTS

| | | | |
|---|---|---|---|
| 2,911,820 | 11/1959 | Dashiell et al. | 73—3 |
| 3,019,649 | 2/1962 | Kuntz et al. | 73—223 |
| 3,254,523 | 6/1966 | Fisher et al. | 73—3 |
| 3,271,993 | 9/1966 | Whitson | 73—3 |

LOUIS R. PRINCE, Primary Examiner

W. A. HENRY II, Assistant Examiner